(12) United States Patent
Biemer

(10) Patent No.: US 9,961,241 B2
(45) Date of Patent: May 1, 2018

(54) VEHICLE VISION SYSTEM WITH CAMERA HAVING MOLDED INTERCONNECT DEVICE

(71) Applicant: MAGNA ELECTRONCS INC., Auburn Hills, MI (US)

(72) Inventor: Michael Biemer, Aschaffenburg-Obernau (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 297 days.

(21) Appl. No.: 14/814,883

(22) Filed: Jul. 31, 2015

(65) Prior Publication Data
US 2016/0037028 A1 Feb. 4, 2016

Related U.S. Application Data

(60) Provisional application No. 62/032,660, filed on Aug. 4, 2014.

(51) Int. Cl.
*H04N 7/18* (2006.01)
*H04N 5/225* (2006.01)

(52) U.S. Cl.
CPC ......... *H04N 5/2252* (2013.01); *H04N 5/2253* (2013.01)

(58) Field of Classification Search
CPC ............................ H04N 5/2252; H04N 5/2253
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 7,965,336 B2 | 6/2011 | Bingle et al. | |
| 8,503,061 B2 | 8/2013 | Uken et al. | |
| 8,542,451 B2 | 9/2013 | Lu et al. | |
| 8,866,907 B2 | 10/2014 | McElroy et al. | |
| 9,233,641 B2 | 1/2016 | Sesti et al. | |
| 9,277,104 B2 | 3/2016 | Sesti et al. | |
| 9,609,757 B2 | 3/2017 | Stegerwald | |
| 2009/0244361 A1 | 10/2009 | Gebauer et al. | |
| 2011/0310248 A1 | 12/2011 | McElroy et al. | |
| 2012/0117745 A1* | 5/2012 | Hattori ................ | B60S 1/0848 15/250.01 |

(Continued)

FOREIGN PATENT DOCUMENTS

WO    WO2010/091347    8/2010

*Primary Examiner* — Tat C Chio
(74) *Attorney, Agent, or Firm* — Honigman Miller Schwartz and Cohn, LLP

(57) ABSTRACT

A camera for a vision system of a vehicle includes a housing having a front housing portion and a rear housing portion. The camera is configured to be disposed at a vehicle so as to have a field of view interior or exterior of the vehicle. The front housing portion houses a lens assembly. The rear housing portion has a connector portion for electrically connecting circuitry of the camera to an electrical connector of the vehicle when the camera is disposed at the vehicle. The circuitry of the camera includes an imager comprising an imaging array having a plurality of photosensing elements. The rear housing portion has circuitry and electrically connecting elements established via molded interconnect device (MID) technology.

20 Claims, 16 Drawing Sheets

(56) References Cited

U.S. PATENT DOCUMENTS

| | | | |
|---|---|---|---|
| 2013/0222595 A1 | 8/2013 | Gebauer et al. | |
| 2013/0242099 A1 | 9/2013 | Sauer et al. | |
| 2013/0328672 A1 | 12/2013 | Sesti et al. | |
| 2013/0344736 A1 | 12/2013 | Latunski | |
| 2014/0071279 A1* | 3/2014 | Mokashi | H04N 7/18 348/148 |
| 2014/0138140 A1 | 5/2014 | Sigle | |
| 2014/0184881 A1* | 7/2014 | McKinley | H04N 5/2253 348/345 |
| 2014/0320636 A1 | 10/2014 | Bally et al. | |
| 2014/0362209 A1 | 12/2014 | Ziegenspeck et al. | |
| 2014/0373345 A1 | 12/2014 | Steigerwald | |
| 2015/0222795 A1 | 8/2015 | Sauer et al. | |
| 2015/0266430 A1 | 9/2015 | Mleczko et al. | |
| 2015/0321621 A1 | 11/2015 | Van Dan Elzen et al. | |
| 2015/0365569 A1 | 12/2015 | Mai et al. | |
| 2016/0037028 A1 | 2/2016 | Biemer | |
| 2016/0268716 A1 | 9/2016 | Conger et al. | |
| 2016/0280150 A1* | 9/2016 | Steinberger | B60R 11/04 |
| 2017/0133811 A1 | 5/2017 | Conger et al. | |

* cited by examiner

Detail C

VEHICLE VISION SYSTEM WITH CAMERA HAVING MOLDED INTERCONNECT DEVICE

CROSS REFERENCE TO RELATED APPLICATION

The present application claims the filing benefits of U.S. provisional application Ser. No. 62/032,660 filed Aug. 4, 2014, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides a camera that has its housing formed or made as a MID (molded Interconnect Device) structure using MID technology.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
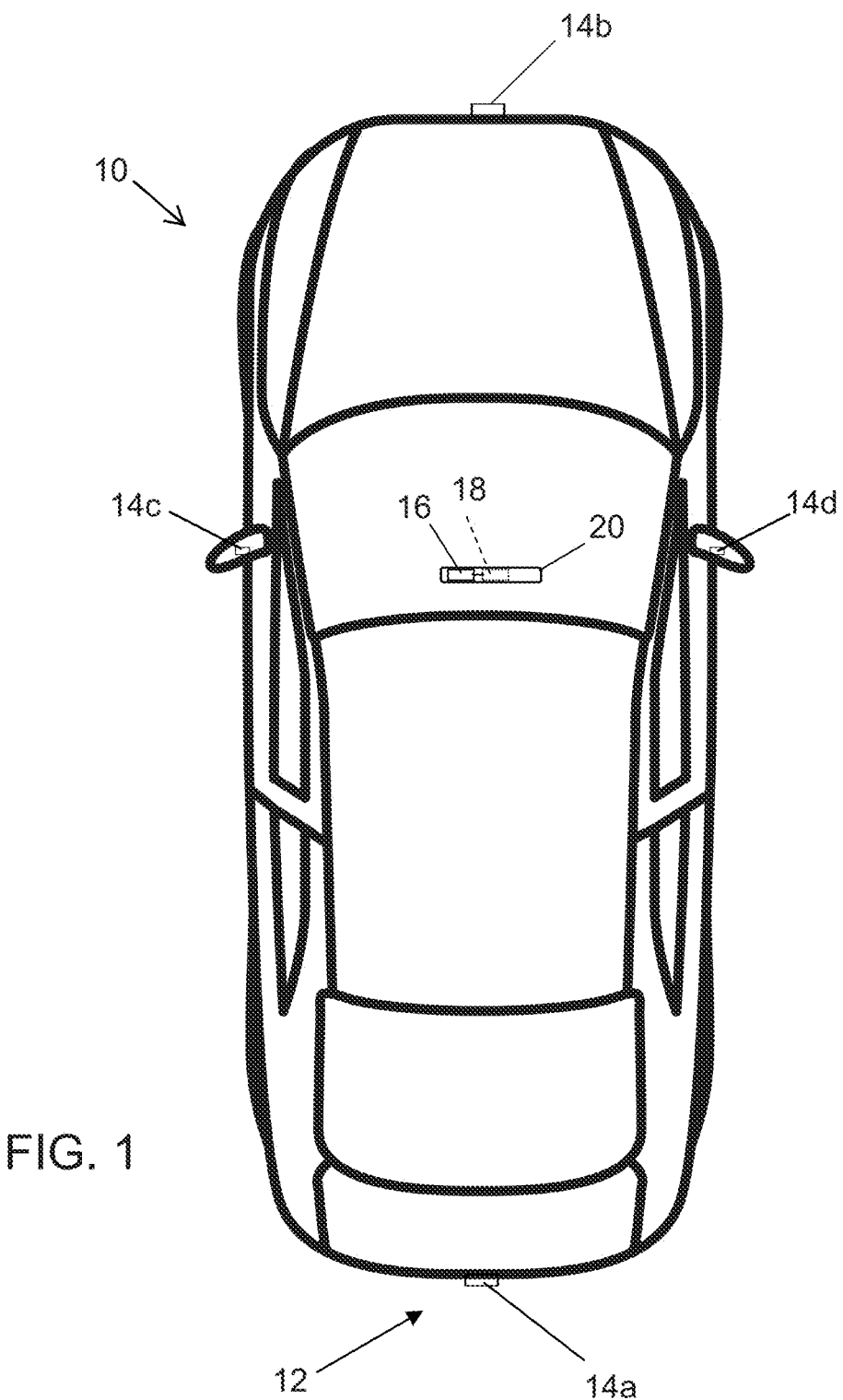
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides a camera housing with its inner surface having electrical conducting structures made by molded interconnect device (MID) technology, such as the camera's lead frame and interconnections between electrical components. The electrical components may be applied directly onto the camera housings routing structure.

The camera may not include any PCB or may have some of the electronic components borne by the MID structure and one or more additional PCBs may bear additional electronic components. The potential additional PCBs may be attached to the lead frame routing structure of the housing by reflow soldering, press fit, welding or bonding or the like.

The camera housing may be made completely in MID or may consist of several MID parts or one or more parts with MID and one or more additional parts without MID. The cost with the MID piece should always be as small as possible while larger structures may be done without MID. In cases where there are more than one camera housing parts in use for completing a camera housing, the interconnection between these parts may be done by MID structures, which may be applied on the edges or made as the connector structure or the like. When applied on the edges, the different part's structures may face and entangle to one another when assembling. For example, circuitry or conductive elements may be established using MID technology at both the front housing portion and the rear housing portion, whereby respective conductive elements or traces of the front and rear housing portions electrically connect when the front and rear housing portions are mated or assembled together or attached/sealed together.

Optionally, the connector structure may be formed as a single piece with the camera housing. The connector structure's lead frame may be designed by conducting MID material. When having a coaxial connector structure, the lead frame of the shielding contact may be made by MID and the core pin socket (or pin) as well. Optionally, the core pin socket (or pin) may be added by insertion molding or press fit, welded or soldered onto the structure while the shielding may be still made by MID. The camera may utilize aspects of cameras of the types described in U.S. patent application Ser. No. 14/609,650, filed on Jan. 30, 2015 and published Aug. 6, 2015 as U.S. Publication No. US-2015-0222795, which is hereby incorporated herein by reference in its entirety.

Figure 2:
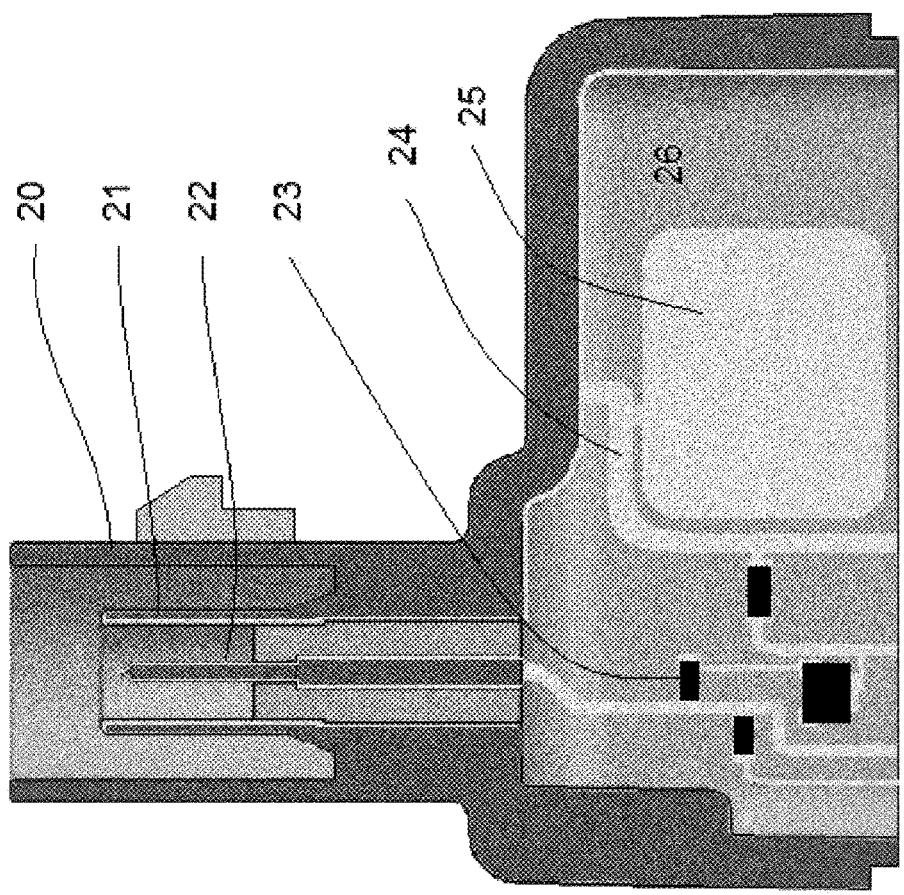
FIG. 2 is a sectional view of a rear housing of a camera in accordance with the present invention.

As shown in FIG. 2, a camera housing's rear body and connector structure 20 are made as one piece, such as by injection and insert molding. The connector structure comprises a conductive area or element or surface 21 on a structure to mate with a coaxial connector's shield contact. The connecting surface is applied by MID and includes an electrically conductive element or trace or traces that leads to the inside of the camera 26. The core pin portion 22 is also established by insert molding with the housing, with its conductive surface also applied by MID. The conductive routing structures or lead frame 24 of the camera bear electronic components 23. Portions of the camera housing inner surface 25 are conductively plated by MID. This provides enhanced EMC shielding characteristics and optionally supports heat dissipation.

Figure 3:
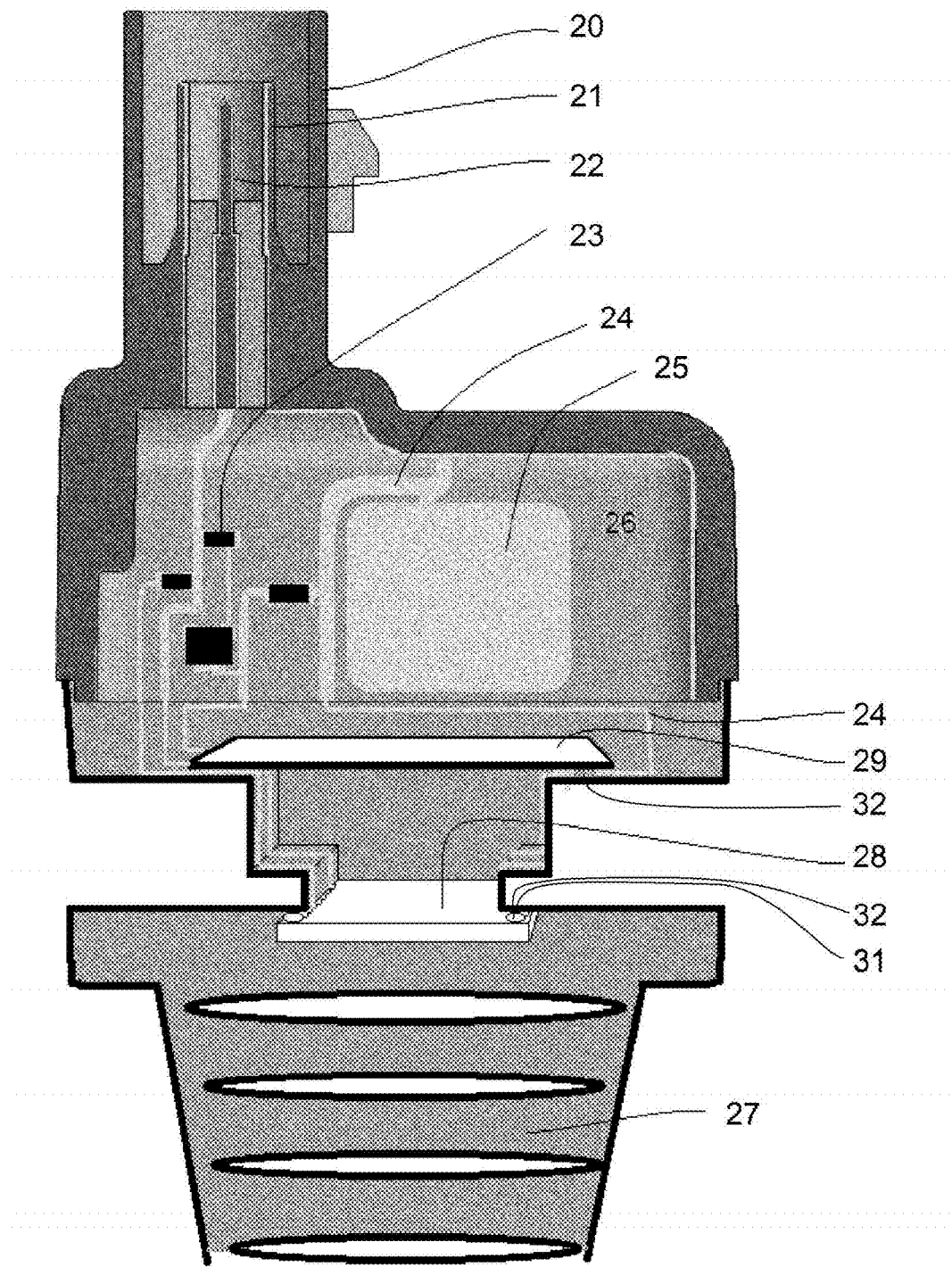
FIG. 3 is another sectional view of the camera rear housing of FIG. 2, shown with a front housing attached thereto having an imager and lens assembly.
Figure 4:
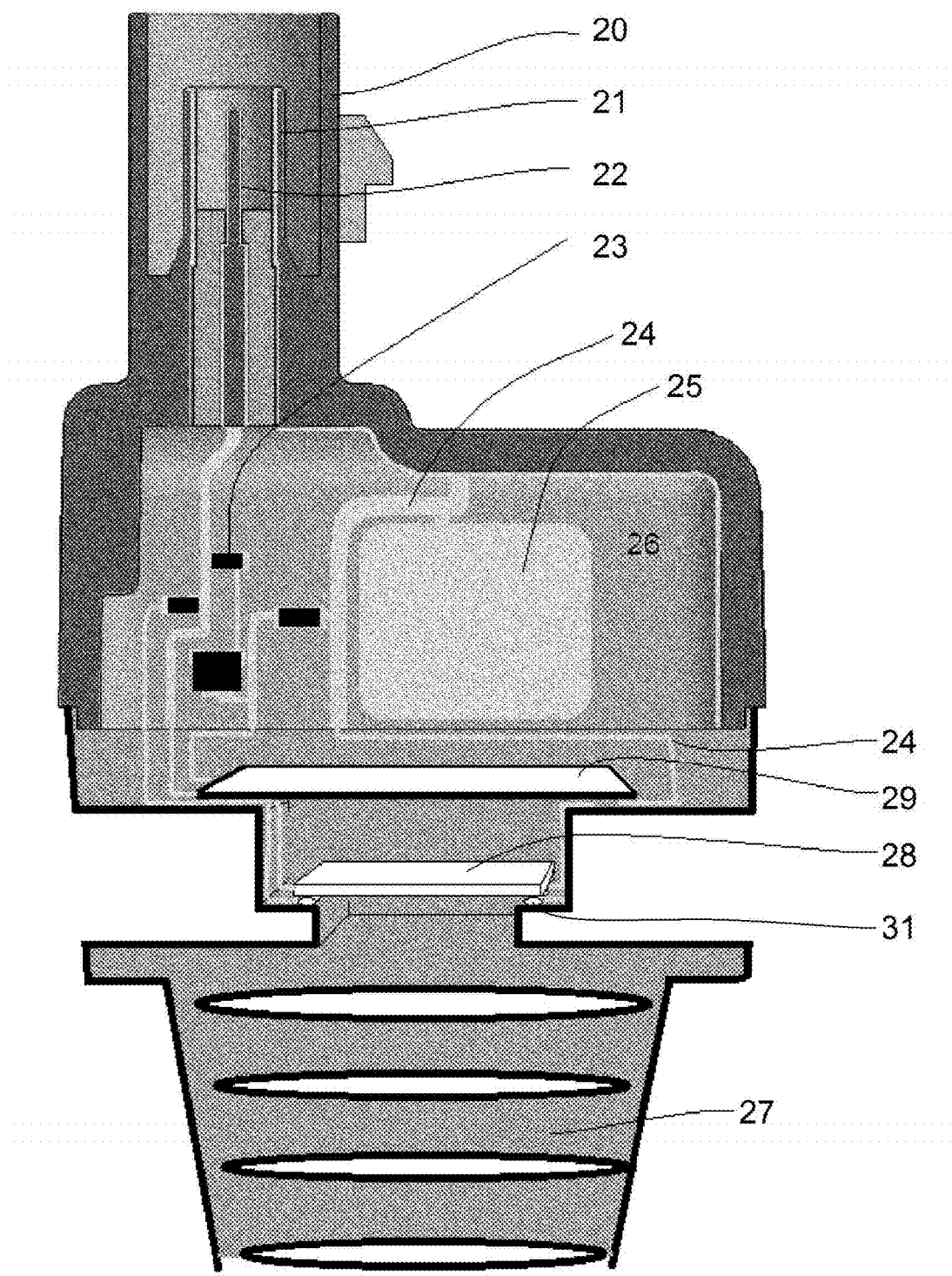
FIG. 4 is another sectional view of the camera rear housing of FIG. 2, having a flip die chip mounted onto an MID lead frame inside the camera housing, with the sensitive imager side facing outbound and the lens system attached thereto.

As shown in FIG. 3, the camera rear body with MID structures is attached or formed with a front body having an imager chip or die 28 and lens system 27 and an optional electronics PCB 29. The optional electronics PCB may bear or support additional electronic components or connector structures, such as by utilizing aspects of International Publication No. WO 2010/091347 and/or U.S. Publication No. US-2013-0242099 and/or U.S. patent application Ser. No. 14/609,650, filed Jan. 30, 2015 and published Aug. 6, 2015 as U.S. Publication No. US-2015-0222795, which are hereby incorporated herein by reference in their entireties.

Figure 9:
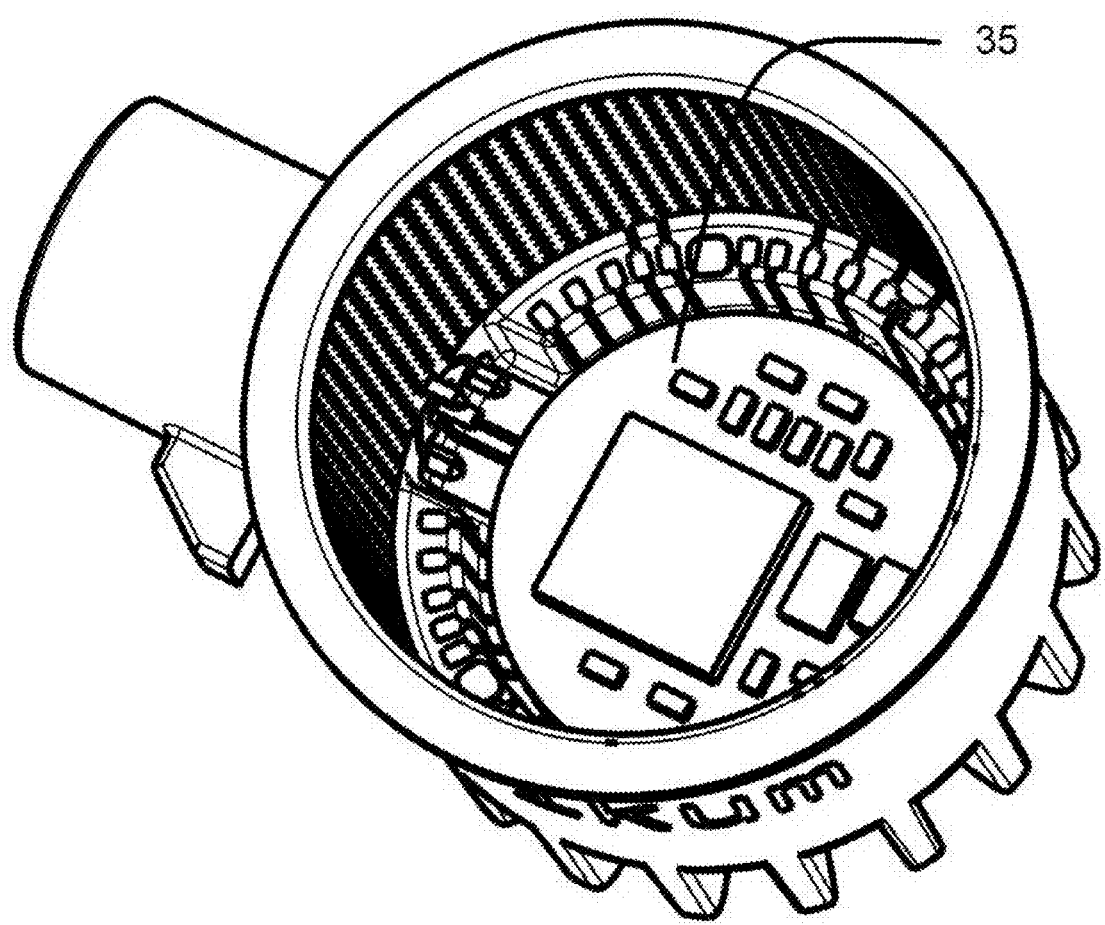
FIG. 9 is a perspective view of the camera with the electronics PCB assembled and before assembling the imager PCB.
Figure 10:
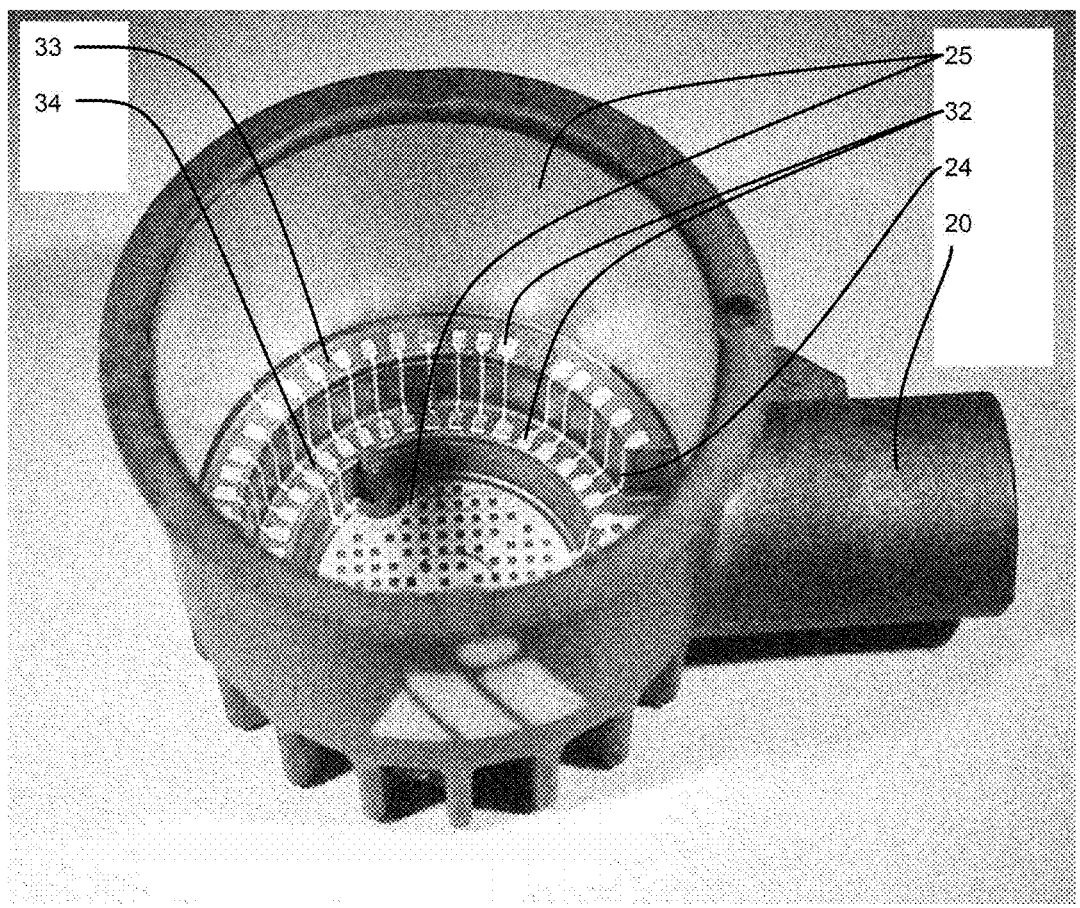
FIG. 10 shows the bottom camera structure with its MID lead frame and plating inside.
Figure 11:
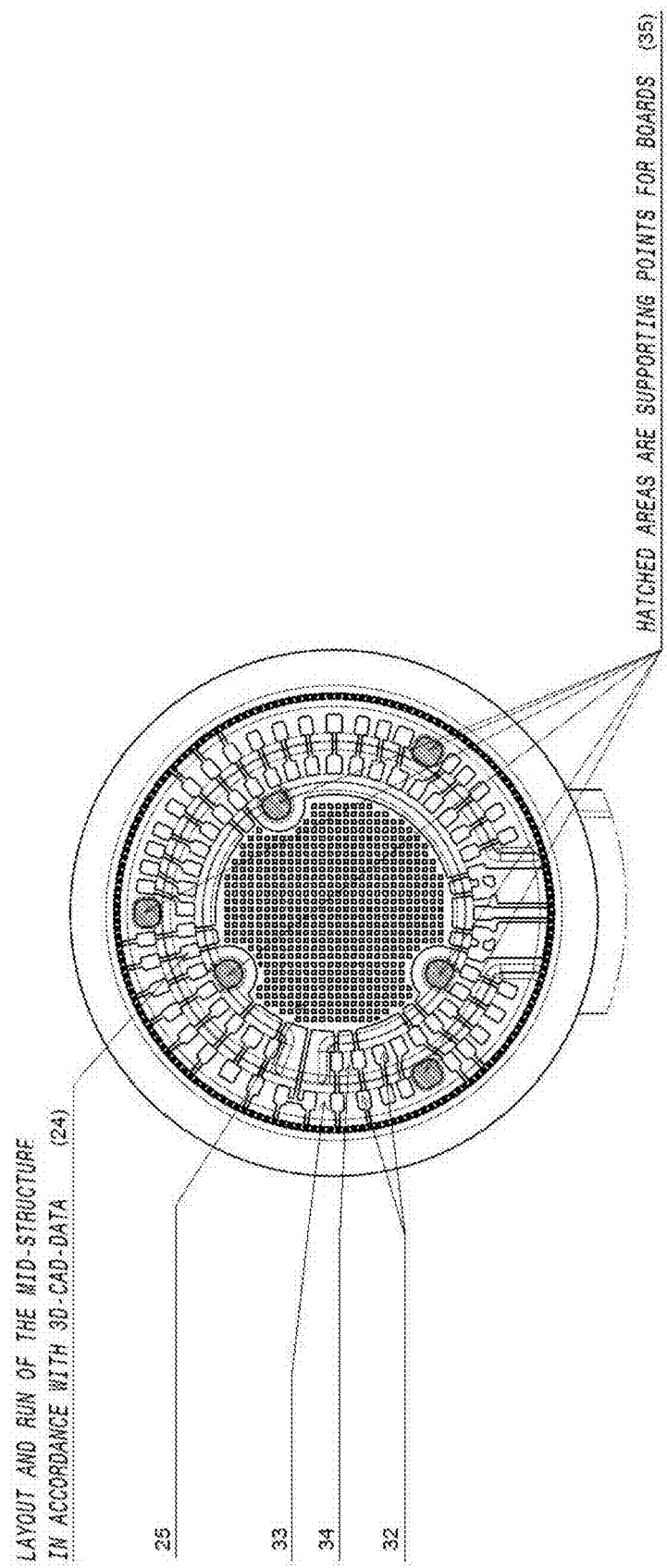
FIG. 11 is a plan view of the bottom camera structure with its MID lead frame inside from overtop.
Figure 12:
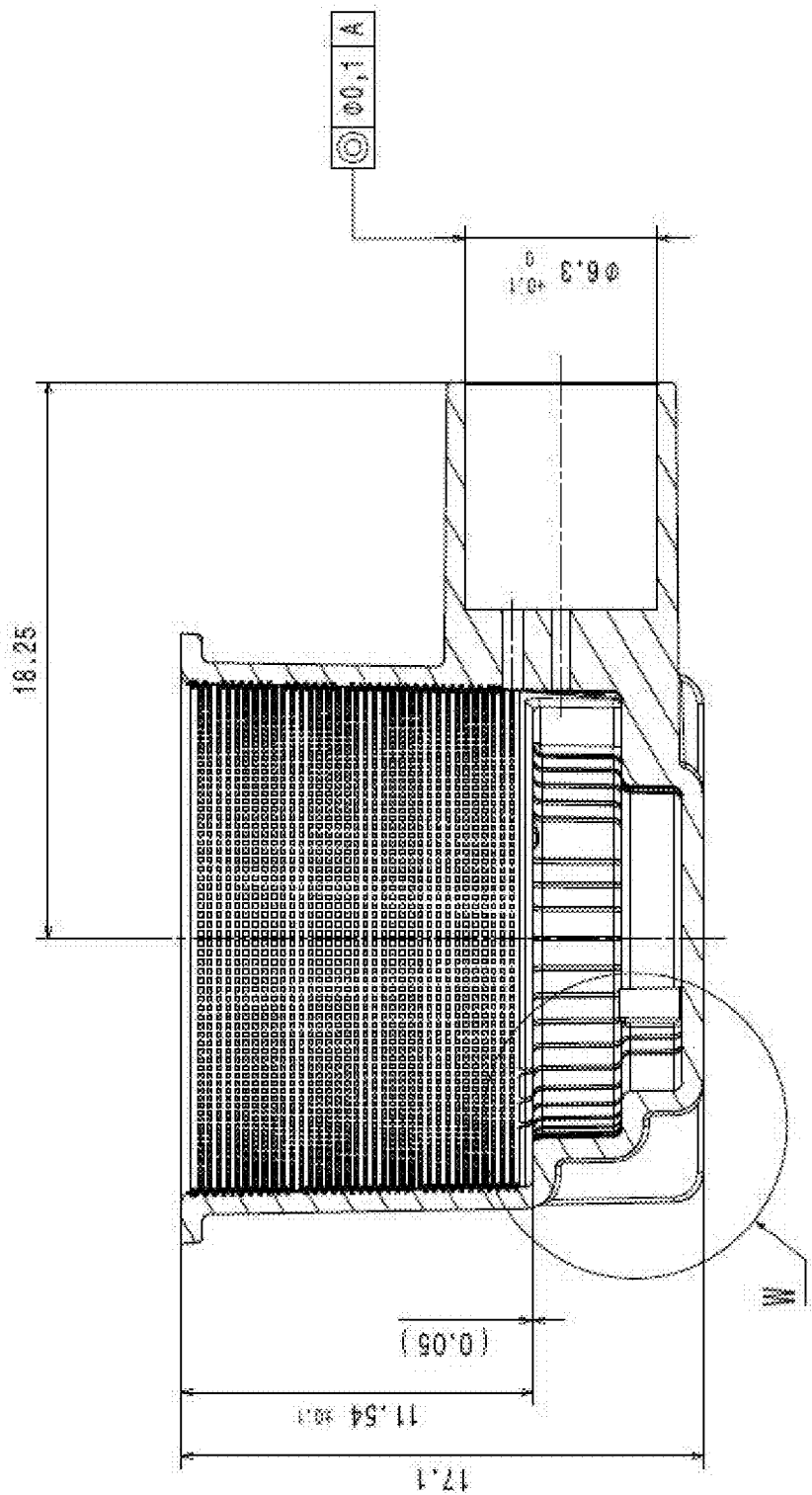
FIG. 12 is a sectional side view of the bottom structure with MID lead frame, shown without the lens system, PCBs and connector metal inlay parts.
Figure 13:
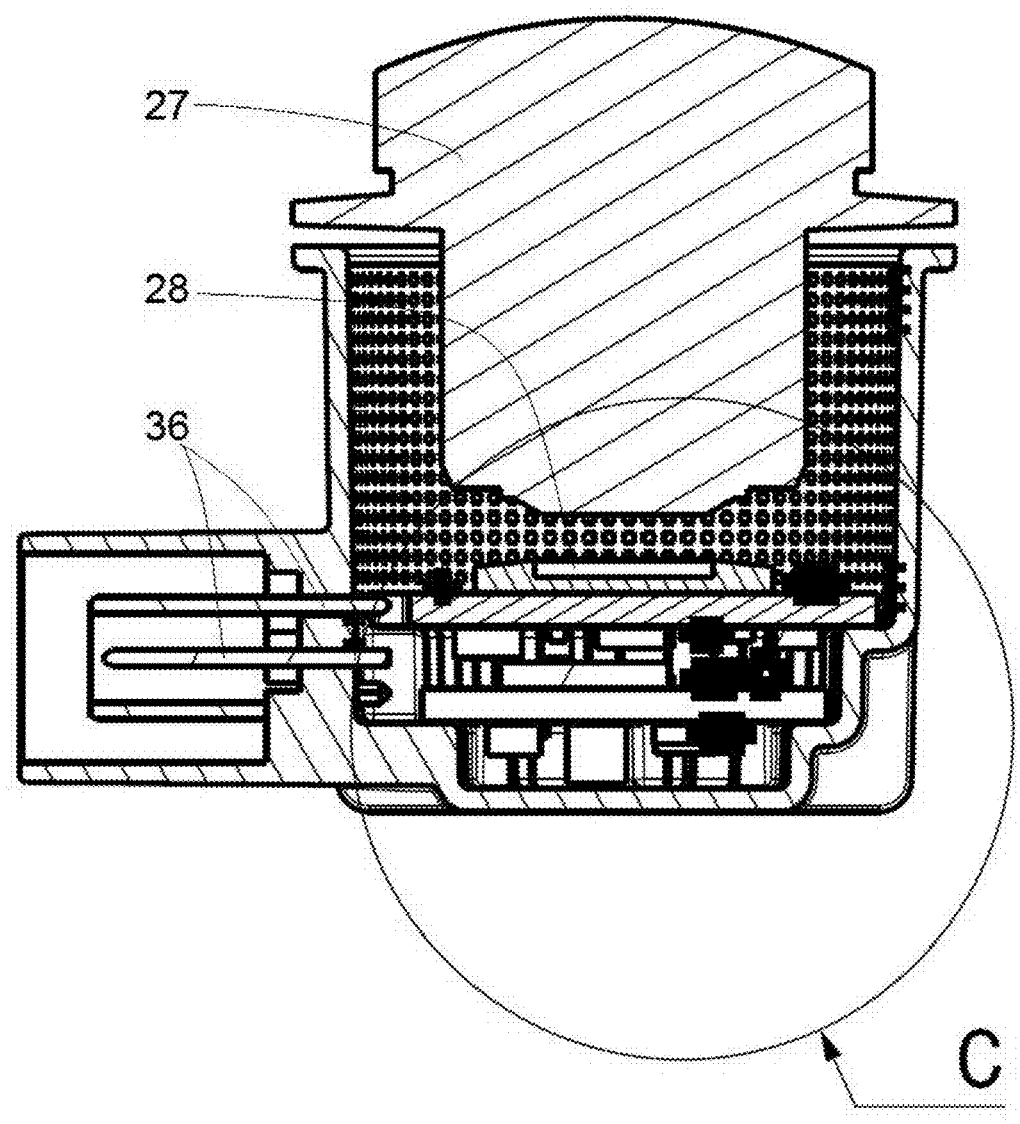
FIG. 13 is a sectional view of the camera in its fully assembled state.
Figure 14:
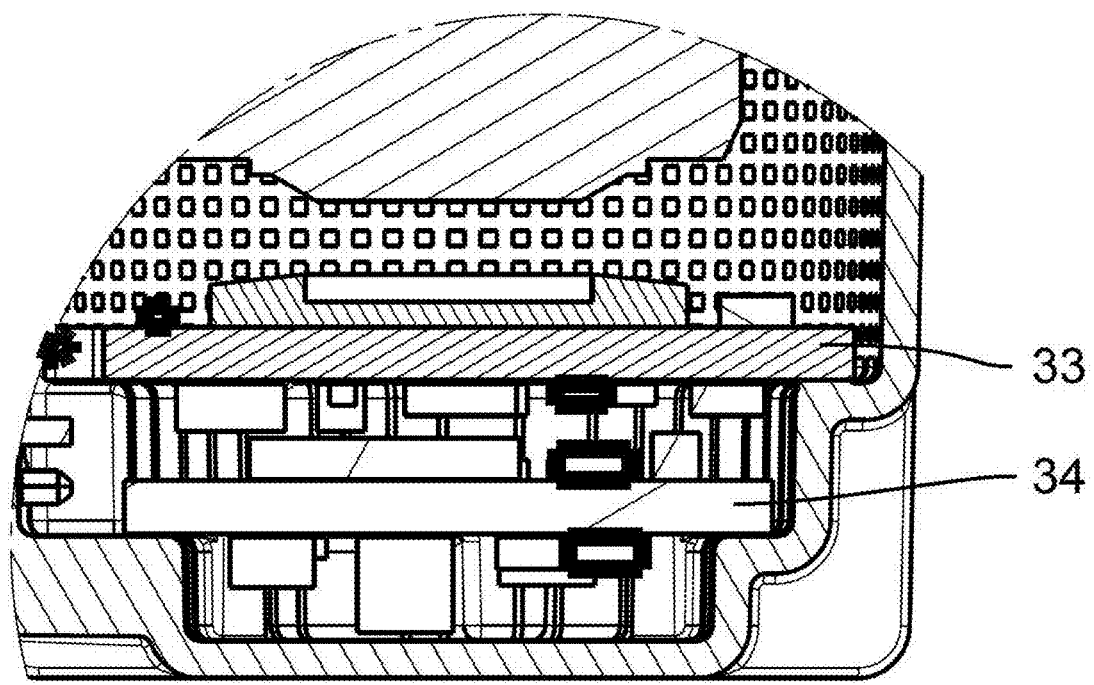
FIG. 14 is an enlarged sectional view of the region C of FIG. 13.
Figure 15A:
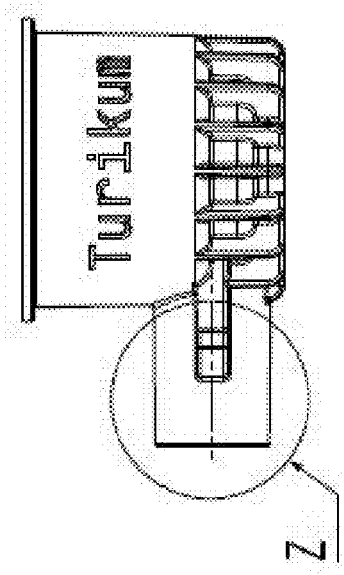
FIGS. 15 A-C are respective side views of the camera bottom structure turned at 0 degrees, 90 degrees and 180 degrees, respectively.
Figure 15B:
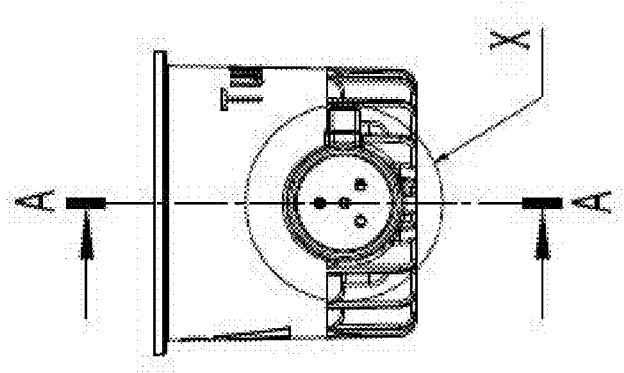
Figure 15C:
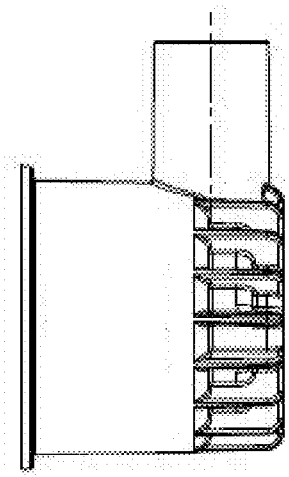

The camera shown in FIGS. 7-15C is another example of a (miniature-) camera using MID structures. The rear structure bears or supports a lower layer 34 electronics PCB (see FIGS. 9 and 14) and a layer 33 above (see FIGS. 11-14) with an imager PCB (see FIGS. 8A, 8B, 13 and 14) both interconnected by MID lead frame structures 24 (see FIGS. 9-13). The PCBs are soldered onto MID pads 32 (see FIGS. 9-11). The PCBs rest on bosses 35 for proper alignment (see FIG. 11). When the PCBs are disposed at and attached at the respective pads and layers/levels, circuitry of the PCBs electrically conductively connect with respective circuitry or traces or MID structures at the level at which the PCB is disposed. Thus, and as can be seen with reference to FIG. 10, a smaller lower PCB may be received in the housing and disposed at the lower level or layer 34 to electrically connect to the MID pads 32 at the lower layer 34, while a larger upper PCB may be received in the housing and disposed at the upper level or layer 33 to electrically connect to the MID pads 32 at the upper layer 33. The rear housing's inside 26 is plated by conducting MID material 25 (see FIGS. 8A, 8B, 9, 10 and 12-14). The coaxial connector structure is part of the housing mold (see FIGS. 15A-C), contacted by inserted lead frame metal parts 36 soldered onto the PCB structure (FIGS. 9, 13 and 15).

Figure 6:
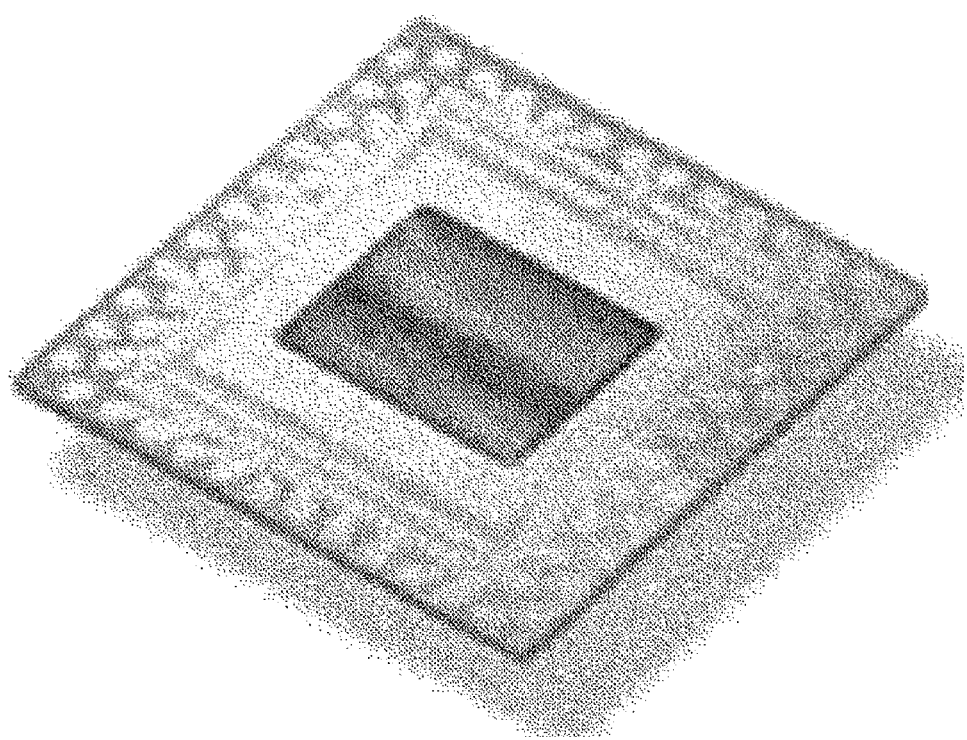
FIG. 6 is a perspective view of the imager of the camera of FIG. 3, shown as a flip chip type of imager.
Figure 7:
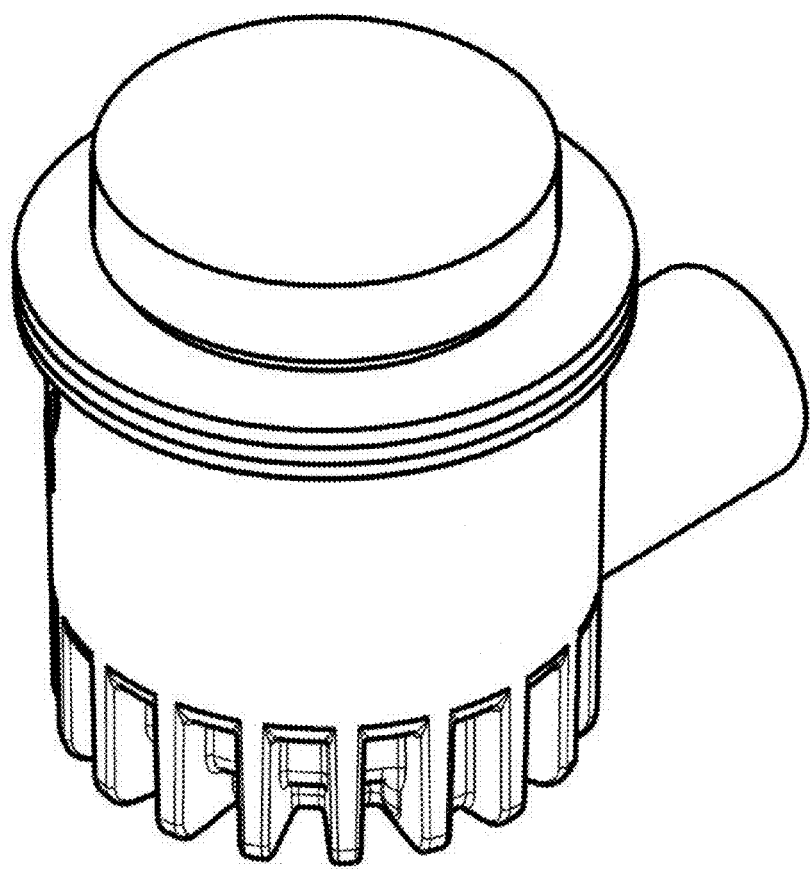
FIG. 7 is a perspective view of another example of a vehicle camera using MID in accordance with the present invention, shown with the camera in its fully assembled state.
Figure 8A:
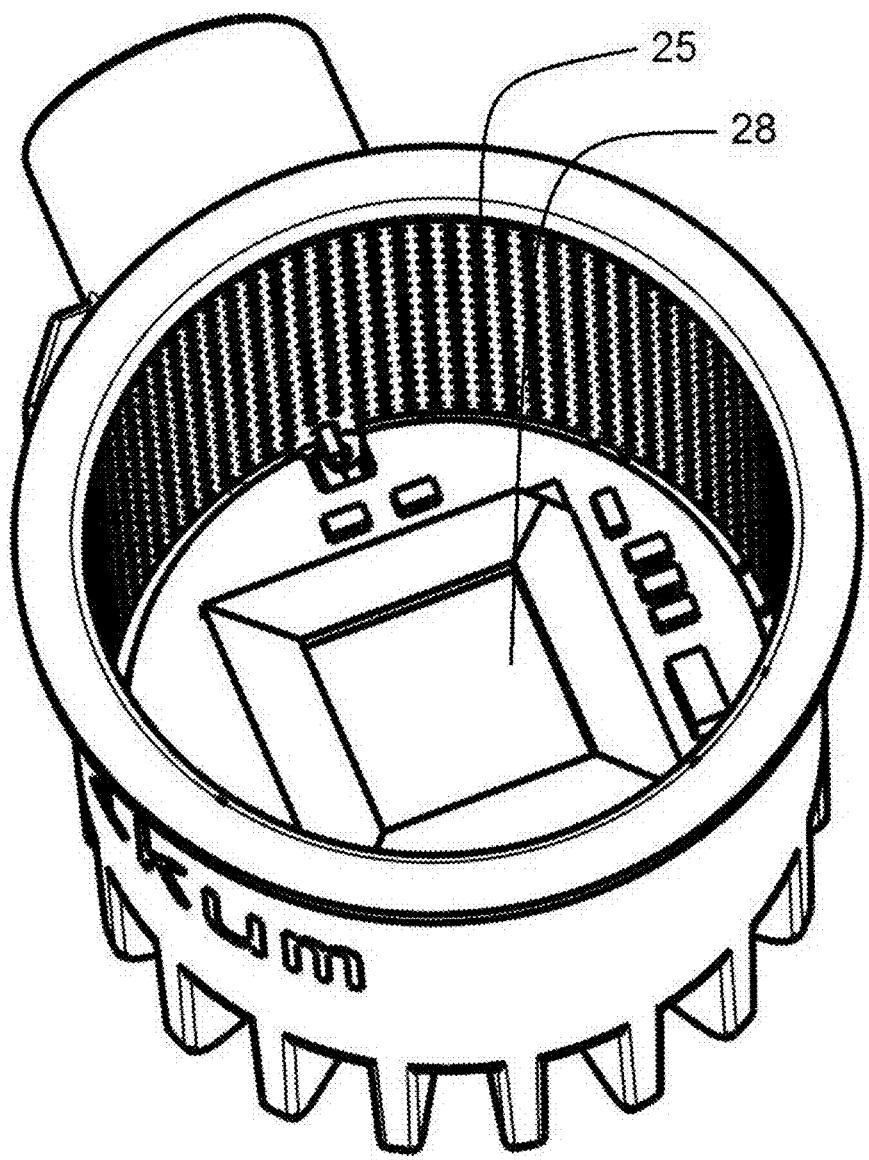
FIGS. 8A and 8B are perspective views of the camera with the imager PCB assembled and before assembling the lens system, with FIG. 8A showing a drawing and FIG. 8B showing a real view.
Figure 8B:
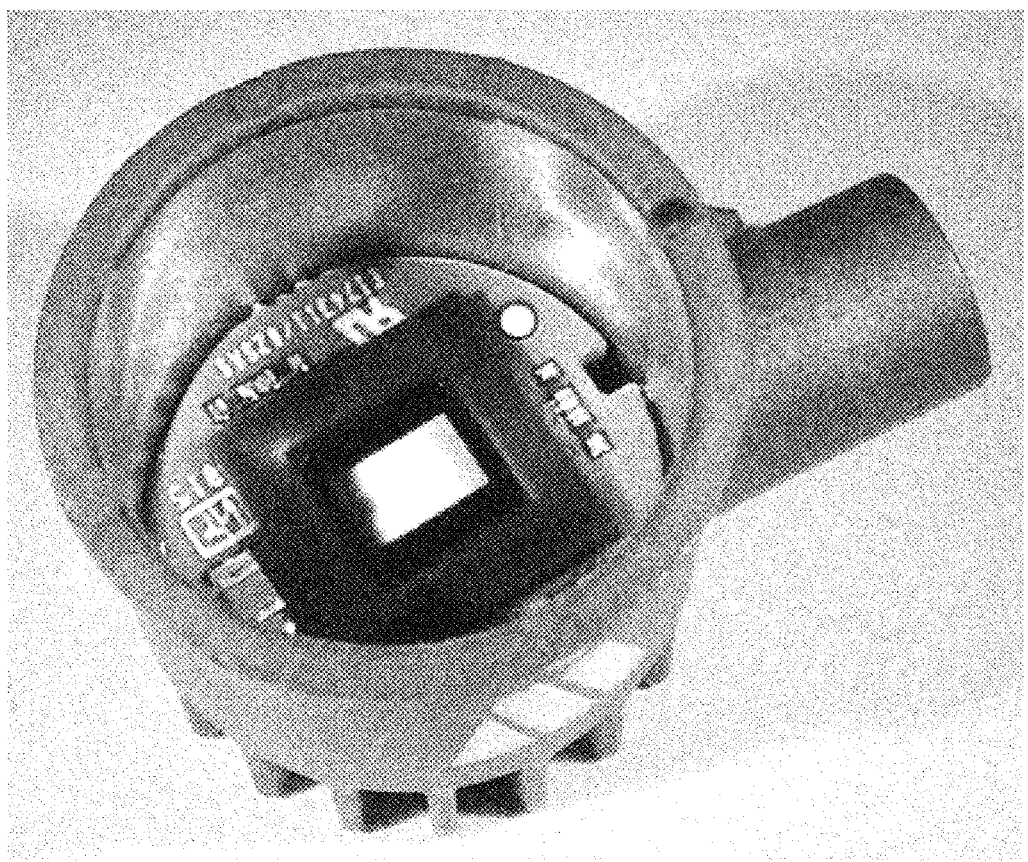

Optionally, and desirably, the camera's imager may comprise a flip chip or flip die type (see FIG. 6). By that, whether using flip chip/flip die or normal configuration the chip's interconnecting pins or pads or ball grid array's (BGA) balls 31 may by directly mountable onto the camera's housing structure while the imager's sensitive pixel surface in the center will face outward towards and through the camera's lens system. Thus, the imager chip may be disposed in the camera housing and not part of a PCB, whereby electrical connection to the imager chip may be made by contact of the imager circuitry with the MID structure or surface of the camera housing.

Optionally, the imager may be naked die and direct bonded. Optionally, additional chips may be naked die and direct bonded to the lead frame MID structure. Optionally, the lens holder may comprise a single piece with the camera housing. Optionally, the lens holder may comprise a separate piece from the camera housing and attached to it via any suitable means.

Figure 5:
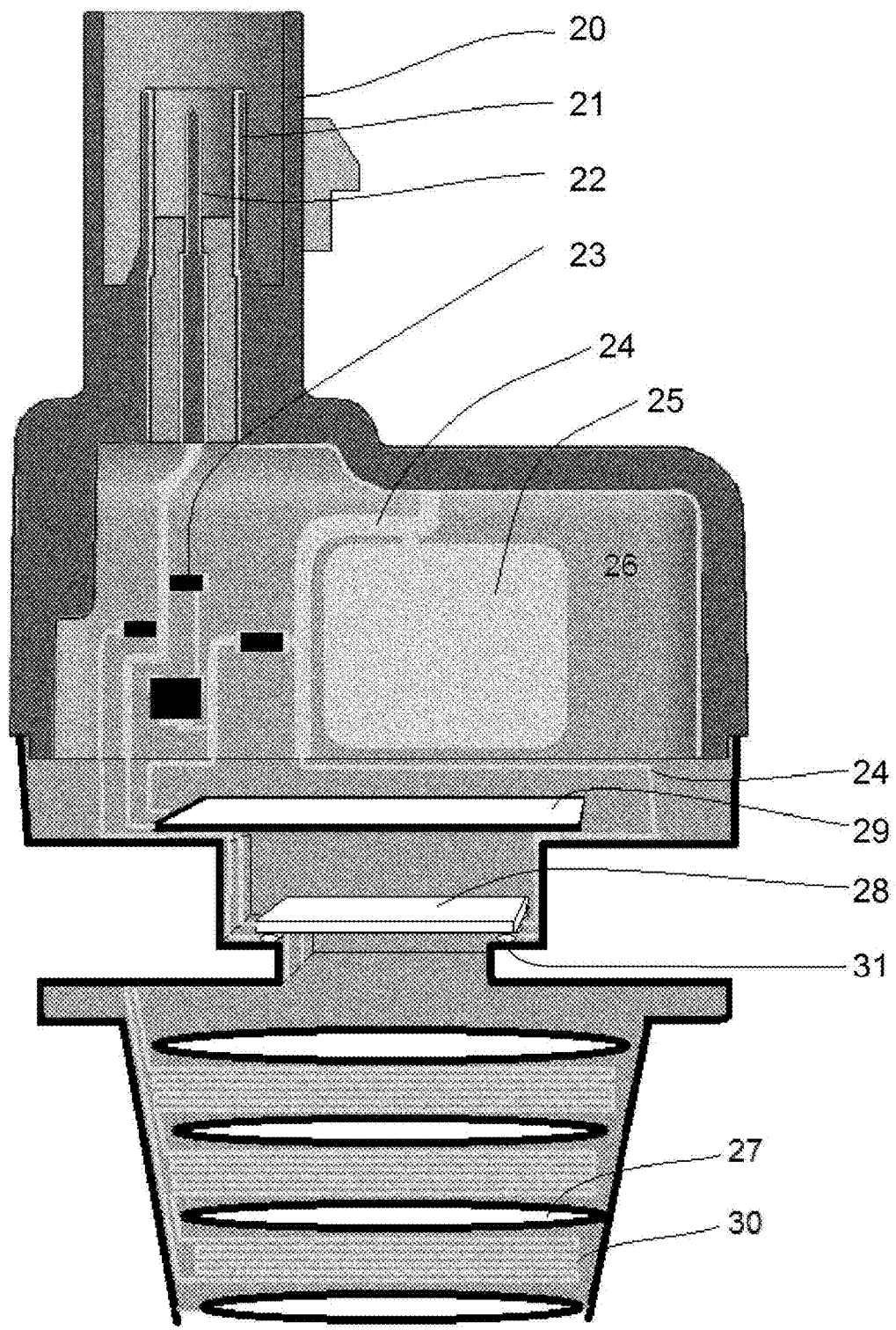
FIG. 5 is another sectional view of the camera similar to the camera of FIG. 4, shown having an additional heating structure comprised by MID in the area of the lens system.

As shown in FIG. 5, the camera may optionally include a MID conductor interface or a MID structure for electrically connecting to conducting lens system inherent actuators or heating devices or having a heating structure 30 formed by a MID structure, such as by utilizing aspects of the cameras described in U.S. patent application Ser. No. 14/705,077, filed on May 6, 2015, and published Nov. 12, 2015 as U.S. Publication No. US-2015-0321621, which is hereby incorporated herein by reference in its entirety. The actuators may be part of a lens system integrated active vibration reduction system (such as like a two dimensional (2D) actoatoric, which is counter controlled to undesired vibration movements of the camera). Other actuators may be provided for active focusing in any suitable manner, such as for shifting lenses laterally for changing the focal distance. Optionally, the camera may include a fluid lens actuation for vibration reduction and/or focus purposes and/or camera view angle control.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera for a vision system of a vehicle, said camera comprising:

a housing comprising a front housing portion and a rear housing portion;

wherein said camera is configured to be disposed at a vehicle so as to have a field of view interior or exterior of the vehicle;

wherein said front housing portion houses a lens assembly;

wherein said rear housing portion has a connector portion for electrically connecting circuitry of said camera to an electrical connector of the vehicle when said camera is disposed at the vehicle;

wherein said rear housing portion comprises a first printed circuit board at a first structure and a second printed circuit board at a second structure;

wherein said front housing portion is mated with said rear housing portion to house said first and second printed circuit boards;

wherein said first printed circuit board has a first surface and a second surface opposite said first surface, said second surface of said first printed circuit board contacting said first structure of said rear housing portion;

wherein said second printed circuit board has a first surface and a second surface opposite said first surface, said second surface of said second printed circuit board contacting said second structure of said rear housing portion;

wherein said second printed circuit board has an imager disposed at said first surface of said second printed circuit board, and wherein said imager comprises an imaging array having a plurality of photosensing elements;

wherein said rear housing portion comprises electrically connecting elements established at and between said first structure and said second structure via molded interconnect device (MID) technology;

wherein said electrically connecting elements electrically connect between electrical contacts at said first structure and electrical contacts at said second structure;

wherein said imager is electrically connected to connecting pads at said second surface of said second printed circuit board, and wherein said connecting pads at said second surface of said second printed circuit board electrically connect at said electrical contacts at said second structure; and wherein said first printed circuit board has first circuitry disposed at said first surface of said first printed circuit board, and wherein said first circuitry is electrically connected to connecting pads at said second surface of said first printed circuit board, and wherein said connecting pads at said second surface of said first printed circuit board electrically connect at said electrical contacts at said first structure.

2. The camera of claim 1, wherein said electrically connecting elements are applied by MID technology at an inner surface of said rear housing portion.

3. The camera of claim 1, wherein a core pin portion of said connector portion of said rear housing portion is configured to connect to a pin portion of a coaxial connector of the vehicle and has its conductive connecting surface applied by MID technology.

4. The camera of claim 1, wherein said rear housing portion has a first cross dimension at said first structure and a second cross dimension at said second structure, and wherein said first cross dimension is less than said second cross dimension.

5. The camera of claim 4, wherein said rear housing portion has an open end at its end that is mated with said front housing portion, and wherein said first and second printed circuit boards are received in said rear housing portion at said open end before said front housing portion is mated with said rear housing portion.

6. The camera of claim 5, wherein said first printed circuit board is spaced from said second printed circuit board along a longitudinal axis of said rear housing portion.

7. The camera of claim 1, wherein said front housing portion has electrically connecting elements established via molded interconnect device (MID) technology.

8. The camera of claim 7, wherein said electrically connecting elements of said front housing portion electrically connect to said electrically connecting elements of said rear housing portion when said front and rear housing portions are mated together.

9. The camera of claim 7, wherein said electrically connecting elements of said front housing portion comprise electrically conductive traces that generate heat when powered so as to defrost or defog at least one optic of said lens assembly.

10. The camera of claim 7, wherein said electrically connecting elements of said front housing portion comprise an actuator for adjusting said lens assembly.

11. The camera of claim 1, wherein said camera is configured to be disposed at the vehicle so as to have a field of view exterior of the vehicle.

12. The camera of claim 11, wherein said camera is part of a surround view system for a vehicle.

13. A camera for a vision system of a vehicle, said camera comprising:
  a housing comprising a front housing portion and a rear housing portion;
  wherein said camera is configured to be disposed at a vehicle so as to have a field of view interior or exterior of the vehicle;
  wherein said front housing portion houses a lens assembly;
  wherein said rear housing portion has a connector portion for electrically connecting circuitry of said camera to an electrical connector of the vehicle when said camera is disposed at the vehicle;
  wherein said rear housing portion comprises a first printed circuit board at a first structure and a second printed circuit board at a second structure;
  wherein said front housing portion is mated with said rear housing portion to house said first and second printed circuit boards;
  wherein said first printed circuit board has a first surface and a second surface opposite said first surface, said second surface of said first printed circuit board contacting said first structure of said rear housing portion;
  wherein said second printed circuit board has a first surface and a second surface opposite said first surface, said second surface of said second printed circuit board contacting said second structure of said rear housing portion;
  wherein said second printed circuit board has an imager disposed at said first surface of said second printed circuit board, and wherein said imager comprises an imaging array having a plurality of photosensing elements;
  wherein said rear housing portion comprises electrically connecting elements established at and between said first structure and said second structure via molded interconnect device (MID) technology;
  wherein said electrically connecting elements electrically connect between electrical contacts at said first structure and electrical contacts at said second structure;
  wherein said imager is electrically connected to connecting pads at said second surface of said second printed circuit board, and wherein said connecting pads at said second surface of said second printed circuit board electrically connect at said electrical contacts at said second structure; and
  wherein said first printed circuit board has first circuitry disposed at said first surface of said first printed circuit board, and wherein said first circuitry is electrically connected to connecting pads at said second surface of said first printed circuit board, and wherein said connecting pads at said second surface of said first printed circuit board electrically connect at said electrical contacts at said first structure;
  wherein said electrically connecting elements are applied by MID technology at an inner surface of said rear housing portion;
  wherein said front housing portion has electrically connecting elements established via molded interconnect device (MID) technology; and
  wherein said electrically connecting elements of said front housing portion electrically connect to said electrically connecting elements of said rear housing portion when said front and rear housing portions are mated together.

14. The camera of claim 13, wherein said rear housing portion has a first cross dimension at said first structure and a second cross dimension at said second structure, and wherein said first cross dimension is less than said second cross dimension, and wherein said rear housing portion has an open end at its end that is mated with said front housing portion, and wherein said first and second printed circuit boards are received in said rear housing portion at said open end before said front housing portion is mated with said rear housing portion.

15. The camera of claim 13, wherein said electrically connecting elements of said front housing portion comprise electrically conductive traces that generate heat when powered so as to defrost or defog at least one optic of said lens assembly.

16. The camera of claim 13, wherein said electrically connecting elements of said front housing portion comprise an actuator for adjusting said lens assembly.

17. The camera of claim 13, wherein said camera is configured to be disposed at the vehicle so as to have a field of view exterior of the vehicle, and wherein said camera is part of a surround view system for a vehicle.

18. A camera for a vision system of a vehicle, said camera comprising:
  a housing comprising a front housing portion and a rear housing portion;

wherein said camera is configured to be disposed at a vehicle so as to have a field of view interior or exterior of the vehicle;

wherein said front housing portion houses a lens assembly;

wherein said rear housing portion has a connector portion for electrically connecting circuitry of said camera to an electrical connector of the vehicle when said camera is disposed at the vehicle;

wherein said rear housing portion comprises a first printed circuit board at a first structure and a second printed circuit board at a second structure;

wherein said front housing portion is mated with said rear housing portion to house said first and second printed circuit boards;

wherein said first printed circuit board has a first surface and a second surface opposite said first surface, said second surface of said first printed circuit board contacting said first structure of said rear housing portion;

wherein said second printed circuit board has a first surface and a second surface opposite said first surface, said second surface of said second printed circuit board contacting said second structure of said rear housing portion;

wherein said second printed circuit board has an imager disposed at said first surface of said second printed circuit board, and wherein said imager comprises an imaging array having a plurality of photosensing elements;

wherein said rear housing portion comprises electrically connecting elements established at and between said first structure and said second structure via molded interconnect device (MID) technology;

wherein said electrically connecting elements electrically connect between electrical contacts at said first structure and electrical contacts at said second structure;

wherein said imager is electrically connected to connecting pads at said second surface of said second printed circuit board, and wherein said connecting pads at said second surface of said second printed circuit board electrically connect at said electrical contacts at said second structure; and wherein said first printed circuit board has first circuitry disposed at said first surface of said first printed circuit board, and wherein said first circuitry is electrically connected to connecting pads at said second surface of said first printed circuit board, and wherein said connecting pads at said second surface of said first printed circuit board electrically connect at said electrical contacts at said first structure;

wherein said electrically connecting elements are applied by MID technology at an inner surface of said rear housing portion; and wherein circuitry of said first and second printed circuit boards disposed in said rear housing portion is electrically connected to said electrically connecting elements of said rear housing portion when said first and second printed circuit boards are disposed in said rear housing portion and contact said electrical contacts at the respective ones of said first structure and said second structure.

19. The camera of claim 18, wherein said rear housing portion has a first cross dimension at said first structure and a second cross dimension at said second structure, and wherein said first cross dimension is less than said second cross dimension, and wherein said rear housing portion has an open end at its end that is mated with said front housing portion, and wherein said first and second printed circuit boards are received in said rear housing portion at said open end before said front housing portion is mated with said rear housing portion.

20. The camera of claim 18, wherein said front housing portion has electrically connecting elements established via molded interconnect device (MID) technology, and wherein said electrically connecting elements of said front housing portion electrically connect to said electrically connecting elements of said rear housing portion when said front and rear housing portions are assembled together.

* * * * *